United States Patent [19]

Kagawa et al.

[11] Patent Number: 4,855,083
[45] Date of Patent: Aug. 8, 1989

[54] SOLIDIFYING AGENT COMPRISING SLAG DUST FROM INDUSTRIAL WASTE, METHOD OF SOLIDIFYING LIQUID ORGANIC HALOGENIDE AND BURNING METHOD FOR DISPOSING OF LIQUID ORGANIC HALOGENIDE

[75] Inventors: Yoshihiro Kagawa; Keimitsu Hori, both of Kitakyushyushi, Japan

[73] Assignee: Taihosangyo Co., Ltd., Osaka, Japan

[21] Appl. No.: 131,439

[22] Filed: Dec. 11, 1987

[30] Foreign Application Priority Data

Jan. 13, 1987 [JP] Japan .................. 62/7117

[51] Int. Cl.$^4$ .................. G21F 9/08; G21F 9/14; F23B 7/00
[52] U.S. Cl. .................. 252/632; 106/76; 106/78; 106/97; 106/117; 106/119; 106/121; 110/342; 110/346; 159/47.3; 159/DIG. 12; 252/628; 252/631; 210/751
[58] Field of Search .................. 252/628, 632, 633; 106/74, 78, 82, 83, 97, 117, 118, 119, 120, 121, 287.35, 306; 110/236, 237, 238, 342, 346; 159/47.3, DIG. 12

[56] References Cited

U.S. PATENT DOCUMENTS

| 2,533,118 | 12/1950 | Kahn | 106/82 |
| 3,988,258 | 10/1976 | Curtiss et al. | 252/628 |
| 4,382,026 | 5/1983 | Drake et al. | 252/628 |
| 4,400,313 | 8/1983 | Roberson et al. | 252/628 |
| 4,404,105 | 9/1983 | Rysman de Lockerente et al. | 210/710 |
| 4,410,365 | 10/1983 | Glukhovsky et al. | 106/117 |
| 4,452,635 | 6/1984 | Noshi et al. | 106/74 |
| 4,459,211 | 7/1984 | Carini | 210/751 |
| 4,505,851 | 3/1985 | Funabashi et al. | 252/628 |
| 4,705,638 | 11/1987 | Ganczarczyk | 210/710 |
| 4,761,183 | 8/1988 | Clarke | 106/117 |

FOREIGN PATENT DOCUMENTS 0700494 11/1979 U.S.S.R. .................. 106/82

Primary Examiner—Howard J. Locker
Attorney, Agent, or Firm—Birch, Stewart, Kolasch & Birch

[57] ABSTRACT

A solidifying agent comprising slag dust from the refining of metals, silicates, water-soluble, high molecular weight compounds, metal salts of an organic acid and calcium carbonate. The solidifying agent is useful for solidifying liquid organic halogenides into solid composites containing organic halogenides. The organic halogenides are disposed of by a burning method which comprises converting the organic halogenides to vapors and disposing the organic halogenides by burning the vapors.

14 Claims, 1 Drawing Sheet

SOLIDIFYING AGENT COMPRISING SLAG DUST FROM INDUSTRIAL WASTE, METHOD OF SOLIDIFYING LIQUID ORGANIC HALOGENIDE AND BURNING METHOD FOR DISPOSING OF LIQUID ORGANIC HALOGENIDE

BACKGROUND OF THE INVENTION

1. Field of the Invention

The present invention relates to solidifying agents obtained from industrial waste. Particularly, the solidifying agent is obtained by blending slag dust derived from the refining of metals, water-soluble, high molecular weight compounds, metal salts of an organic acid, calcium carbonate and silicates. The solidifying agent is useful for treating and rendering harmless, liquid organic halogenides, such as PCB. The chemical structure of PCB (polychlorinated biphenyl, $C_{12}H_5Cl_n$) is as follows:

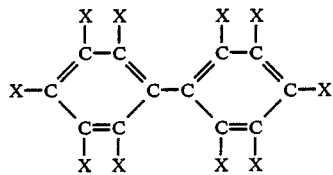

wherein X is H or Cl.

The present invention further relates to a method of solidifying liquid organic halogenides using the solidifying agent. Yet further, the present invention relates to a method for disposing of liquid organic halogenides.

2. Discussion of Related Art

Liquid organic halogenides, such as PCB, are noxious in addition to being remarkably stable compounds. Accordingly, it is difficult to dispose of these compounds. When the use of the liquid PCB became prohibited, some enterprises temporarily kept the liquid PCB in drum shaped cans, transformers and the like. However, after a number of years passed without any suitable liquid PCB disposal method having been settled on, it was feared that the liquid PCB may leak out of the drum shaped cans or vessels due to the corrosion thereof or the liquid PCB may leak out of the transformers which have been left unattended. Also of concern is pollution caused by the leakage of liquid PCB which is stored in various types of holding facilities. Even though the expense of constructing these facilities has been exceedingly large, such leakage could still not be prevented during spontaneous calamities such as earthquakes. Generally during such calamities, the liquid PCB is dispersed out of the area.

Various methods of rendering liquid PCB harmless have been proposed. Of these proposed methods, at present it appears that the burning method is the most advantageous. This conventional burning method consists of a three-stage burning process. Particularly the burning method comprises a first burning stage at 1,400° C. or more, a second burning stage at 1,500° C. or more and a third burning stage at 1,400° C.

According to the above described conventional method, a large number of stages or steps are required and the use of very high temperatures are also required in maintaining the combustion. Further, it is difficult to completely decompose liquid PCB and to render the liquid PCB completely harmless by the use of this process.

SUMMARY OF THE INVENTION

It is an object of the present invention to provide a method of treating and rendering harmless liquid organic halogenides, such as liquid PCB.

Another object is to carry out the treatment under good, workable conditions at relatively lower temperatures using facilities which are simple in construction.

A further object is to provide an efficient method, i.e., one which will simultaneously dispose of industrial waste as slag dust and use the disposed slag dust to provide solidifying agents for solidifying liquid organic halogenides.

A yet further object is to provide for solidifying the liquid organic halogenides.

A still further object is to provide a burning method for disposing of the liquid organic halogenides which provides for a reduction of the treating cost.

The foregoing and other objects of the present invention will become apparent from the description hereinafter.

BRIEF DESCRIPTION OF THE DRAWINGS

The present invention will become more fully understood from the detailed description given hereinbelow and the accompanying drawing which are given by way of illustration only, and thus are not limitative of the present invention, and wherein.

DETAILED DESCRIPTION

Figure 1:
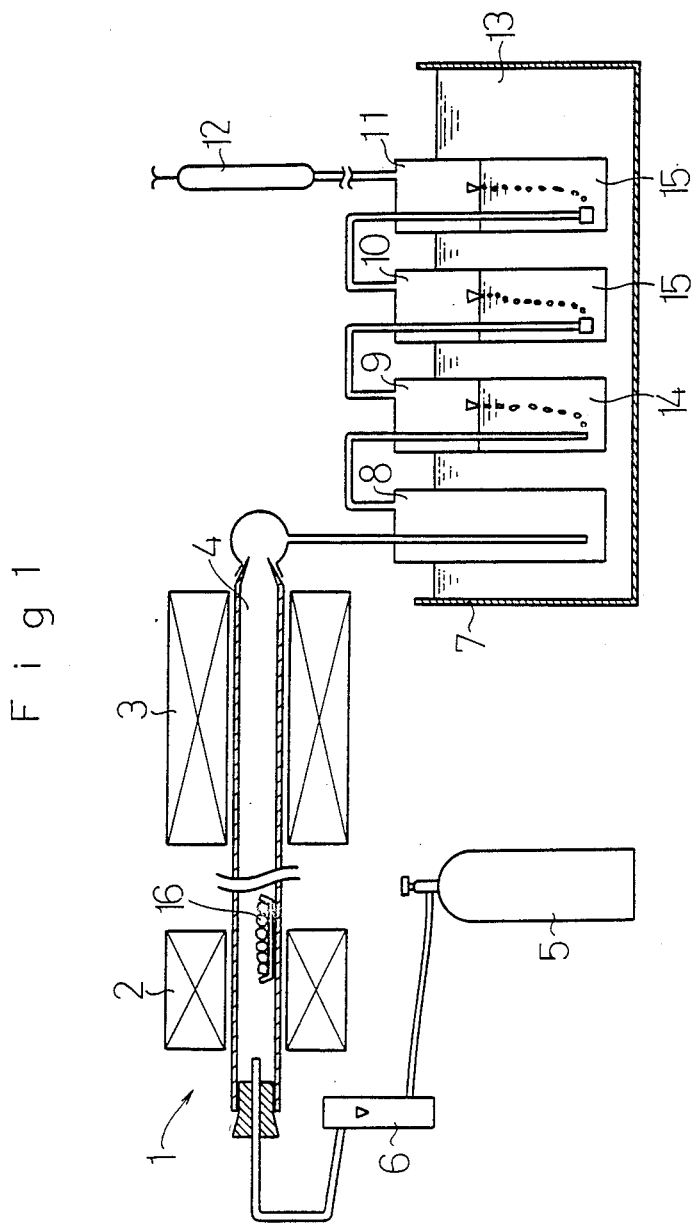
FIG. 1 is a partial sectional view of a combustion furnace used in a burning method according to the present invention.

The present invention is characterized by a mixture obtained by blending slag dust from the refining of metals containing at least activated alumina, caustic lime, magnesium oxide and manganese oxide, with silicates, water-soluble, high molecular weight compounds, metal salts of an organic acid and calcium carbonate. The mixture is used as a solidifying agent for solidifying and rendering harmless liquid organic halogenides.

Particularly, slag dust discharged from metal refineries are used. One example of such slag dust is shown in the following Table 1.

TABLE 1

| Component | Content (% by weight) |
|---|---|
| Activated alumina | 7–16 |
| Iron oxide | 2–8 |
| Titanium oxide | 0.3–2 |
| Silicon oxide | 18–30 |
| Calcium oxide | 38–55 |
| Magnesium oxide | 4–10 |
| Manganese oxide | 1–5 |

With respect to the silicates, natural silicates can be used. Examples of the silicates include sodium silicate, calcium silicate, magnesium silicate, calcium sodium silicate and the like.

As to the water-soluble, high molecular weight compounds, those containing a large number of carboxylic groups and hydroxylic groups therein are used and appear to contribute to the gelation and the water-insolubilization of the liquid halogenides. These compounds include polyvinyl alcohol, starch and derivatives thereof, cellulose derivatives such as methoxycellulose, hydroxycellulose, methylcellulose and ethylcellulose, sodium polyacrylate, acrylic amide-acrylic ester copolymers, sodium alginate, gelatine, casein and the like.

The metal salts of an organic acid contribute to the pulverization of the solidified products and water-insolubilization of the organic halogenides. The organic acid includes higher fatty acids, such as stearic acid, caprillic acid, lauric acid, myristic acid, palmitic acid, linolic acid, linoleic acid and oleic acid, aromatic carboxylic acids, such as benzoic acid, salicylic acid, p-hydroxybenzoic acid, naphthoic acid and tannic acid, and the like. In addition, metals which form salts together with said organic acid include aluminum, manganese, cobalt, calcium, magnesium, iron, zinc, nickel and the like.

The compositions of components contained in the solidifying agents according to the present invention are shown in the following Table 2.

TABLE 2

| Component | Content (% by weight) |
| --- | --- |
| Slag dust (Table 1) | 50–100 |
| Water-soluble, high molecular weight compounds | 1–5 |
| Metal salts of an organic acid | 3–10 |
| Calcium oxide | 3–15 |
| Magnesium calcium meta-silicate | 3–10 |
| Calcium carbonate | 3–10 |

In addition, bentonite, porcelain clay and the like can be added to the solidifying agents as fillers.

The method of solidifying liquid organic halogenides is characterized in that the solidifying agents, the liquid organic halogenides and water are uniformly mixed together with stirring to turn said liquid organic halogenides into solid composites.

In the solidifying method of the present invention, the solidifying agents are preferably initially, uniformly mixed by stirring, followed by the addition of water to the stirred solidifying agents and then the resulting mixture is further stirred. Various modifications of the solidifying method are possible. For example, water may be added prior to the blending of the components of said solidifying agents. In addition, the components of said solidifying agents can be blended in optional orders. For example, the water-soluble high molecular weight compounds may be initially dissolved in organic solvents, such as methanol, and then added to the water. The resulting mixture may be added to a mixture of other components and then added to the liquid organic halogenides. In addition, the components may previously be uniformly mixed, followed by the resulting mixture being mixed with water and the liquid organic halogenides.

In these various mixing processes, the temperature becomes raised due to the occurrence of an exothermic reaction. But when the liquid organic halogenides are added at temperatures of about 120° to 150° C. and stirred for about 2 to 5 minutes, powdery products are obtained. In addition, in the case where the liquid PCB is to be treated, the treatment is preferably carried out at temperatures of the boiling point thereof or less, namely from about 90° to 145° C. Furthermore, during the treatment period, control of the reaction temperature can be carried out by increasing or decreasing the quantity of the inorganic fillers to be added.

The solidifying agents are added to the liquid organic halogenides at a ratio of 50 to 200 parts by weight based on 100 parts by weight of the liquid organic halogenides depending upon the particular type of the liquid organic halogenides treated and the particular reaction conditions used. In addition, water is added at a ratio of 5 to 100 parts by weight based on 100 parts by weight of the liquid organic halogenides.

A burning method for disposing of liquid organic halogenides is characterized in that liquid organic halogenides are treated with a solidifying agent comprised of slag dust from the refining of metals to form solid composites containing organic halogenides, heating the solid composites at high temperatures in the presence or absence of oxygen to vaporize the organic halogenides and burning the vaporized organic halogenides in the presence of oxygen-rich air.

The burning method according to the present invention comprises a first process, in which the vaporized halogenides are discharged from the solid composites and heated under conditions in which the vaporized halogenides would have heightened combustability, and a second process in which the vaporized halogenides are burned. The first process is carried out at temperatures of from about 700° to 1,000° C., preferably from about 850° to 950° C. Oxygen is not always required in the first process. The second process is carried out at temperatures of from about 800° to 1,300° C., preferably from about 900° to 1,200° C.

The oxygen-content in oxygen-rich air is preferably 30% or more, in contrast to the usual oxygen-content of 21% in air, for the achievement of the treatment within a short time of from about 1.8 to 2.5 seconds. In the case where the oxygen-content is 30% or less, higher temperatures, such as 1,100° C. or more, are required for combustion and in the case where the combustion is carried out at relatively lower temperatures, such as 1,000° C. or less, a long retention time of 5 seconds or more in the combustion furnace is required.

Further, in the case where the burning method according to the present invention is industrially put into practice, a combustion furnace provided with a heating chamber and a combustion chamber can be supplied by changing the condition of the heating chamber and the combustion chamber, respectively. It is not always necessary to divide both chambers. The combustion furnace provided with only the combustion chamber may be used. In the latter case, the discharge and the combustion of the vaporized organic halogenides are carried out in one combustion chamber. Either vertical type combustion furnaces or horizontal type combustion furnaces can be used as the industrial combustion furnace but it is preferable to use rotary kiln type combustion furnaces or the combustion furnace as shown in FIG. 1. In the above described method, solid composites can be supplied in optional forms such as powders, pellets and lumps.

In the solidifying method according to the present invention, the calcium oxide and the magnesium oxide contained in the solidifying agents both react with water to generate a large amount of reaction heat and to produce calcium hydroxide and magnesium hydroxide, respectively. Further, these hydrating reactions lead to the impregnation of the porous portions of the silicates and the slaked lime with the organic halogenides and the galenite reaction leads to a discharge of silane to produce monosiloxane. It is thought that monosiloxane is replaced by an alkyl group at a position where silane is discharged, a chlorine ion is being taken in another pore to be stabilized, and further the surface is being coated with calcium hydroxide and magnesium oxide when cooled and condensed, whereby organohalopolysiloxane is synthesized. In addition, it is thought that said organohalopolysiloxane and nonionic slurries, such as activated alumina, titanium oxide and manganese oxide, are turned into pasty hydrates by stirring when water is added and the resulting pasty hydrates are turned into water-insoluble, pozzolanized products in the hydrating reaction. According, the organic halogenides are not dissolved out into the water from the resulting water-insoluble, pozzolanized products.

Further, in the burning method according to the present invention, when the organohalopolysiloxane is heated at high temperatures, organic halogenides contained in said organohalopolysiloxane are vaporized, and the vaporized organic halogenides are efficiently burned in the presence of oxygen-rich air and become decomposed. A part of the chlorine generated by the above described decomposition is combined with calcium ions to exist in the ashes as calcium chloride while the rest of chlorine exists as hydrogen chloride gas and chlorine gas.

Preferred Embodiments

Solidifying agents are prepared in accordance with the compositions as shown in the following Table 3.

TABLE 3

| Component | Content |
|---|---|
| Slag dust | 70 |
| Carboxycellulose | 3 |
| Calcium stearate | 5 |
| Calcium oxide | 7 |
| Magnesium calcium meta-silicate | 5 |
| Calcium carbonate | 5 |
| Bentonite | 5 |

In addition, slag dust comprising the components as shown in said Table 1 were used in Table 3. The numerical values are all represented as parts by weight.

The liquid organic hlogenides to be treated are oils containing PCB housed in transformers and compositions as shown in the following Table 4.

TABLE 4

| Component | Content (% by weight) |
|---|---|
| **PCB (KC 500) | 60 |
| Chlorobenzene | 40 |

**PCB (KC 500) is $C_{12}H_5Cl_5$ (molecular weight: 326.5).

The solidifying agents as shown in Table 3 of 200 g are placed in a small-sized mixer and subsequently 50 g of water having normal temperature is added and mixed with stirring. At this time, an exothermic reaction occurred, wherein the temperature reached 140° C. after about 25 seconds. Immediately after the temperature reached 140° C., transformer oils shown in Table 4 were added and continually stirred. After a lapse of 4 minutes, the mixture became powdery and was taken out. At this time, the temperature was 88° C. The resulting powdery products were dried in air. After cooling to a normal temperature, the resulting powdery products are tested for PCB being dissolved out. The test is carried out in accordance with Notice No. 13(λ)-Sho 48 from the Ministry of Environment. No dissolving-out of PCB was observed. The combustion furnace 1 used in the burning process is shown in FIG. 1. Combustion furnace 1 comprises an auxiliary combustion furnace 2 (length: 200 mm) provided with electrical heating coils wound therearound, a main combustion furnace 3 (length: 700 mm) arranged in parallel to said auxiliary combustion furnace 2 and likewise provided with electrical heating oils wound therearound and a combustion tube 4 (a reaction tube made of alumina, length: 1,500 mm; inside diameter: 26 mm) arranged so as to pass through said auxiliary combustion furnace 2 and said main combustion furnace 3.

In the burning process, the inside of the main combustion furnace is initially heated to a designated temperature and then sample 16, housed in a combustion boat was pushed into auxiliary combustion furnace 2. Air, whose oxygen concentration was previously set at 30% or 40%, is charged to combustion tube 4 from air cylinder 5. Reference numeral 6 designates a flow meter. The retention time of vaporized PCB within combustion tube 4 was regulated depending upon the quantity of air fed. The temperature within the auxiliary combustion furnace 2 was raised up to 1,000° C. at a gradient of 15° to 19° C./min. During the temperature-rising process within the auxiliary combustion furnace 2, PCB is gradually vaporized from sample 16 and the resulting PCB vapor is introduced into main combustion furnace 3, whereby the PCB vapor is burned out.

Next, the collection of PCB contained in an exhaust gas was carried out according to the Notice "The Procedure of Measuring Gas Phase PCB" (1972) of the Ministry of Environment. As shown in FIG. 1, the exhaust gas is introduced into a scrubbing bottle containing a 10% NaOH aqueous solution of 150 ml from the pointed end of combustion tube 4 through empty bottle 8, where the exhaust gas is scrubbed, passed through scrubbing bottles 10 and 11 containing n-hexane 15 of 150 ml, respectively, in turn, further passed through flow florisil column 12 and discharged into the air. Each of bottles 8, 9, 10, and 11 had been previously cooled in water bath 7 (1° to 5° C.) housing cooling 13 therein.

The analysis of PCB was carried out as follows:

First, the sample and a residue after the combustion treatment were extracted with 200 ml of n-hexane for a period of 24 hours in a Soxhlet's extractor. Then the resulting extract was subjected to a treatment which will be mentioned later. Following the treatment, sample liquid a and sample b were tested to determine the residue remaining after the burning treatment.

Besides, being in the 10%-NaOH aqueous solution in which the PCB contained in the exhaust gas was collected, PCB was also contained in the n-hexane 14 in scrubbing bottle 9 and in the n-hexane 15 contained in scrubbing bottles 10 and 11, and were collected in a separation funnel. Subsequently, scrubbing bottles 9, 10 and 11 and empty bottle 8 are each rinsed three times with 50 ml of n-hexane, respectively. The washings are added to the contents in said separation funnel. A hexane-layer from the separation funnel was subjected to the following described treatment A to obtain sample liquid c which is to be tested.

(Treatment A)

The n-hexane layer is washed twice with 200 ml of purified water and dehydrated with sodium sulfate anhydride. Then the dehydrated n-hexane layer is concentrated to about 5 ml or less in a KD concentrator. The resulting concentrated n-hexane layer is put into a test tube having a capacity of 25 ml and a 1N-KOH solution in 5 ml of ethanol is added to the test tube. The contents in the test tube are violently shaken and left unattended for 24 hours. Purified water of a quantity three times that of ethanol is added to the contents in the test tube and shaken. The contents in the test tube are left unattended and then upper n-hexane layer is taken out. This n-hexane layer is rinsed with a 0.1N-KOH aqueous solution and purified water and then purified by passing the rinsed layer through the florisil column. Subsequently, this column is eluated with ethyl ether and the eluated ethyl ether-hexane layer is concentrated to about 3 ml in the KD concentrator.

The sample solutions to be tested a, b and c, each having been obtained in the above described manner, were each respectively subjected to an ECD/GC analysis and measured to determine the quantity of the PCB contained therein.

The ECD/GC analysis was carried out under the conditions such that an ECD of 10 mCi from a source 63 Ni was used as a detector and a glass column of 3×2 m filled with Chromosorb QAW-DMCS of 80 to 100 meshes impregnated with OV-1 at a ratio of 2% was used as the column.

The measurement results of the PCB are shown by experiment Nos. 1 to 4 in the following Table 5 together with the combustion conditions.

TABLE 5

| Experiment No. | Temperature of the main combustion furnace (°C.) | Concentration of oxygen (%) | Quantity of air (l/min) | Retention time (sec) | Weight of sample (mg) | Quantity of PCB contained in the sample (mg) | Quantity of PCB contained in the exhaust gas (μg) | Quantity of PCB contained in the residues after the combustion (μg) | Quantity of PCB remained in the combustion tube (μg) |
|---|---|---|---|---|---|---|---|---|---|
| 1 | 1200 | 30 | 1.0 | 2.0 | 979.4 | 177.3 | <0.04 | <0.04 | <0.04 |
| 2 | 1100 | 30 | 1.1 | 2.0 | 991.7 | 179.5 | <0.04 | <0.04 | <0.04 |
| 3 | 1000 | 30 | 1.25 | 2.05 | 975.1 | 176.5 | <0.04 | <0.04 | <0.04 |
| 4 | 1000 | 40 | 1.25 | 2.06 | 982.3 | 177.8 | <0.04 | <0.04 | <0.04 |
| 5 | 1000 | 21 | 1.1 | 5.1 | 997.4 | 180.5 | <0.04 | <0.04 | <0.04 |
| 6 | 1000 | 21 | 1.0 | 2.5 | 978.6 | 177.4 | 4.72 | <0.04 | 1.66 |

Experiment No. 5 and experiment No. 6 in above described Table 5 are shown for reference. It can be confirmed from Table 5 that the combustion treatment under the oxygen-rich condition is advantageous in treatment effect and retention time within the combustion furnace.

Subsequently, the content of chlorine in the 10%-NaOH aqueous solution layer obtained from the separation funnel is measured according to JIS K 0102. The measurement results are shown in the following Table 6.

TABLE 6

| Experiment No. | Total quantity of chlorine contained in the sample (mg) | Quantity of chlorine contained in an exhaust gas (mg) | Discharging coefficient of chlorine (%) |
|---|---|---|---|
| 1 | 172.5 | 105.1 | 60.9 |
| 2 | 174.7 | 99.8 | 57.1 |
| 3 | 171.7 | 101.6 | 59.2 |
| 4 | 173.0 | 100.5 | 58.1 |
| 5 | 175.6 | 88.2 | 50.2 |
| 6 | 172.6 | 78.2 | 45.3 |

The experiment Nos. of Table 6 correspond to those of Table 5. The discharging coefficient of chlorine showed a rate of the quantity of chlorine contained in an exhaust gas to the total quantity of chlorine contained in the sample. According to the present invention, a method is provided which is capable of solidifying liquid organic halogenides, such as liquid PCB. The solidification of the halogenides is accomplished inexpensively and results in the solidified halogenides being in a stabilized form, that is a form from which the solidified halogenides will not dissolve out. The method effectively utilizes industrial waste. Further, the present invention provides a method which is capable of essentially completely decomposing liquid organic halogenides in an efficient manner at remarkably lower temperatures with a reduction of retention time within the combustion furnace. This provides for a significant industrial meaning.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for disposing of liquid organic halogenides which comprises: adding silicates, water-soluble, high molecular weight compounds, metal salts of an organic acid, calcium carbonate and slag dust from the refining of metals containing at least activated alumina, caustic lime, magnesium oxide and manganese oxide, and water to form a mixture, and stirring and uniformly blending the mixture to form solid composites containing said organic halogenides.

2. The method of claim 1 wherein the solid composites containing organic halogenides are heated at a high temperature in the presence or absence of oxygen to vaporize the organic halogenides and burning the vaporized organic halogenides in the presence of oxygen-rich air.

3. The method of claim 1, wherein said solid composites containing organic halogenides are pelletized.

4. The method of claim 1, wherein the silicates are individually selected from sodium silicate, calcium silicate, magnesium silicate or calcium sodium silicate.

5. The method of claim 1, wherein the water-soluble, high molecular weight compounds are individually selected from polyvinyl alcohol, starch or a derivative thereof, methoxycellulose, hydroxycellulose, methylcellulose, ethylcellulose, sodium polyacrylate, an acrylic amide-acrylic ester copolymer, sodium alginate, gelatine or casein.

6. The method of claim 1, wherein the organic acid is stearic acid, caprillic acid, lauric acid, myristic acid, palmitic acid, linolic acid, linoleic acid, oleic acid, benzoic acid, salicylic acid, p-hydroxybenzoic acid, naphthoic acid or tannic acid and the metal salts are individually selected from aluminum, manganese, cobalt, calcium, magnesium, iron, zinc or nickel.

7. The method of claim 1, wherein a mixing ratio of the solidifying agent to the liquid organic halogenides is 50 to 200 parts by weight to 100 parts by weight.

8. The method of claim 1, wherein a mixing ratio of water to the liquid organic halogenides is 5 to 100 parts by weight to 100 parts by weight.

9. The method of claim 2, wherein the heating is conducted at a temperature of from about 700° to 1,000° C.

10. The method of claim 2, wherein the burning is conducted at a temperature of from about 800° to 1,300° C.

11. The method of claim 2, wherein the oxygen content of the oxygen-rich air is 30% or more.

12. The method of claim 11, wherein the burning is conducted for a period of from about 1.8 to 2.5 seconds.

13. The method of claim 2, wherein the oxygen content of the oxygen-rich air is 30% or less and the burning is conducted at a temperature of 1,1000° C. or more.

14. The method of claim 1, wherein the oxygen content of the oxygen-rich air is 30% or less, the burning is conducted at a temperature of 1,000° C. or less and for a period of 5 seconds or more.

* * * * *